US008358838B2

United States Patent
Matsushita et al.

(10) Patent No.: US 8,358,838 B2
(45) Date of Patent: *Jan. 22, 2013

(54) RED EYE DETECTING APPARATUS, RED EYE DETECTING METHOD AND RED EYE DETECTING PROGRAM STORED ON A COMPUTER READABLE MEDIUM

(75) Inventors: Takafumi Matsushita, Kanagawa (JP); Jun Enomoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1044 days.

This patent is subject to a terminal disclaimer.

(21) Appl. No.: 12/294,931

(22) PCT Filed: Mar. 30, 2007

(86) PCT No.: PCT/JP2007/057695
§ 371 (c)(1),
(2), (4) Date: Jan. 15, 2009

(87) PCT Pub. No.: WO2007/116947
PCT Pub. Date: Oct. 18, 2007

(65) Prior Publication Data
US 2010/0172577 A1 Jul. 8, 2010

(30) Foreign Application Priority Data
Mar. 30, 2006 (JP) .................................. 2006-095755

(51) Int. Cl.
*G06K 9/00* (2006.01)
(52) U.S. Cl. ....................................................... 382/165
(58) Field of Classification Search .................. 382/103, 382/115–118, 162–167, 173, 190, 209; 358/518–520; 348/61, 77–78; 396/155, 396/157–158
See application file for complete search history.

(56) References Cited

U.S. PATENT DOCUMENTS 7,024,035 B1 4/2006 Enomoto
(Continued)

FOREIGN PATENT DOCUMENTS
EP 0 961 225 A2 12/1999
(Continued)

OTHER PUBLICATIONS

International Search Report for corresponding International App. No. PCT/JP2007/057695, mailed May 22, 2007, 1 page in English.

(Continued)

*Primary Examiner* — Jose Couso
(74) *Attorney, Agent, or Firm* — Sughrue Mion, PLLC (57) ABSTRACT

There is provided a red eye detecting apparatus including a red eye region designating section that causes a user to designate a red eye region in an image so as to obtain a designated red eye region, a red eye searching region determining section that determines a red eye searching region including therein the designated red eye region which is obtained by the red eye region designating section, a red eye candidate detecting section that searches for red eye within the red eye searching region which is determined by the red eye searching region determining section, to detect one or more red eye candidates, a face position detecting section that detects one of a position of a face and a position of an area of the face other than eyes within the red eye searching region which is determined by the red eye searching region determining section, and a red eye position judging section that selects, from the red eye candidates detected by the red eye candidate detecting section, a red eye candidate that is positioned at a predetermined position with respect to the position detected by the face position detecting section, as a red eye candidate to be subjected to a red eye correcting process.

13 Claims, 8 Drawing Sheets

U.S. PATENT DOCUMENTS

| | | | |
|---|---|---|---|
| 7,155,058 B2 * | 12/2006 | Gaubatz et al. | 382/167 |
| 7,613,332 B2 * | 11/2009 | Enomoto et al. | 382/115 |
| 7,636,477 B2 * | 12/2009 | Terakawa | 382/209 |
| 7,769,233 B2 * | 8/2010 | Enomoto et al. | 382/190 |
| 2003/0142285 A1 | 7/2003 | Enomoto | |
| 2005/0220347 A1 | 10/2005 | Enomoto et al. | |

FOREIGN PATENT DOCUMENTS

| | | |
|---|---|---|
| EP | 1 394 723 A2 | 3/2004 |
| EP | 1 480 168 A2 | 11/2004 |
| JP | 10-233929 A | 9/1998 |
| JP | 2000-076427 A | 3/2000 |
| JP | 2000-137788 A | 5/2000 |
| JP | 2000-148980 A | 5/2000 |
| JP | 2000-149018 A | 5/2000 |
| JP | 2001-148780 A | 5/2001 |
| JP | 2003-283849 A | 10/2003 |
| JP | 2004-145287 A | 5/2004 |

OTHER PUBLICATIONS

CN Communication, dated Jan. 10, 2011, issued in corresponding CN Application No. 200780019892.8, 6 pages in Chinese.

JP Communication, dated Mar. 16, 2010, issued in corresponding JP Application No. 2006-095755, 2 pages with partial English translation.

EP Communication, dated Jul. 6, 2011, issued in corresponding EP Application No. 07741131.2, 6 pages.

* cited by examiner

RED EYE DETECTING APPARATUS, RED EYE DETECTING METHOD AND RED EYE DETECTING PROGRAM STORED ON A COMPUTER READABLE MEDIUM

TECHNICAL FIELD

The present invention relates to a red eye detecting apparatus, a red eye detecting method and a red eye detecting program stored on a computer readable medium. More particularly, the present invention relates to a red eye detecting apparatus, a red eye detecting method and a red eye detecting program stored on a computer readable medium for detecting red eye in an image.

BACKGROUND ART

When an image of a person is captured with the use of a flash, the pupils of the person may look red or gold in the captured image. This is called the red-eye or gold-eye effect. The red-eye or gold-eye effect is not a very favorable result for the image-captured person. Therefore, a variety of image processing methods have been proposed to correct the red-eye or gold-eye effect so that the pupils show their natural color in the captured image. Here, several exemplary methods will be described in the following. A user is asked to designate a to-be-processed region that includes the eyes with an incorrect color. Based on the color value of the designated to-be-processed region obtained with reference to the hue, saturation and lightness of the to-be-processed region, a red eye correcting process is performed on the pupils of the eyes (see Patent Document 1, for example). Alternatively, a captured image is added with image-capturing information including the information about the flash used, the exposure value (Ev value), the shutter speed, and the aperture value), and the red eye correcting process is performed only on images which are judged to possibly have the red-eye effect therein (see Patent Document 4, for example).

Many other methods have been proposed. A candidate region which includes therein a face of a person is extracted from an image. Subsequently, the extracted candidate region is divided into a plurality of smaller regions and compared with a face region pattern in which the characteristic values of the plurality of smaller regions are set in advance, so that a face region is extracted from the candidate region (see Patent Document 2, for example). Alternatively, a region showing a face of a person is extracted from an image. When the color density of the extracted face region corresponds to a predetermined threshold value, a candidate region which may include the person's trunk is extracted. In this way, the extracted face region is evaluated in terms of accuracy (the likelihood where the extracted region shows the face of the person) based on the color densities and saturations of the face and trunk regions, so that the face region is accurately extracted (see Patent Document 3, for example). As a further alternative example, a plurality of candidate regions which may show the face of a person are extracted from an image. Subsequently, the accurate face region is extracted in such a manner that each of the extracted candidate face regions is evaluated in terms of accuracy based on the degree of overlapping (see Patent Document 5, for example).

[Patent Document 1] Unexamined Japanese Patent Application publication No. 2000-76427
[Patent Document 2] Unexamined Japanese Patent Application publication No. 2000-137788
[Patent Document 3] Unexamined Japanese Patent Application publication No. 2000-148980
[Patent Document 4] Unexamined Japanese Patent Application publication No. 2004-145287
[Patent Document 5] Unexamined Japanese Patent Application publication No. 2000-149018

DISCLOSURE OF THE INVENTION

Problems to be Solved by the Invention

However, according to the invention disclosed in Patent Document 1, the user is required to accurately designate, with the use of a mouse, a keyboard or the like, the to-be-processed region which includes the red eye, by specifying the central parts of the pupils of the eyes, or identifying the red eye with a frame circumscribing the red eye, for example. Therefore, the user needs to carefully designate the region including the red eye, and is thus significantly burdened when there are many images to be subjected to the red eye correcting process according to the invention disclosed in Patent Document 1. In addition, redundant work is necessary to designate the region including the red-eye effect according to the invention disclosed in Patent Document 1, which may lengthen the time period required to complete the red eye correcting process. Here, it is also possible to automatically extract a red-concentrated region in the image and perform the red eye correcting process on the extracted region, according to the invention disclosed in Patent Document 1. However, the extracted red-concentrated region may show something other than the red-eye effect, for example, light in the image, and be mistakenly subjected to the red eye correcting process.

The invention disclosed in Patent Document 4 can extract only an image which is judged to have the red-eye effect therein based on the added image-capturing information, and perform the red-eye correcting process on the extracted image. According to the technique disclosed in Patent Document 4, however, the face of the person needs to be identified in the extracted image, and the red eye further needs to be identified in the identified face region. Which is to say, the image processing method according to the invention disclosed in Patent Document 4 requires a face extracting process, which has considerable image processing burden, to be performed on the entire captured image. For this reason, it may be difficult to increase the efficiency of the red eye correcting process. Note that the method to detect the face of a person in a captured image is disclosed in Patent Documents 2, 3 and 5.

In view of the above, an object of the present invention is to provide a red eye detecting apparatus, a red eye detecting method and a red eye detecting program stored on a computer readable medium which can solve the above-identified problems. This object is achieved by combining the features recited in the independent claims. The dependent claims define further effective specific example of the present invention.

Means for Solving the Problems

To solve the above-described problems, a first embodiment of the present invention provides a red eye detecting apparatus including a red eye region designating section that causes a user to designate a red eye region in an image so as to obtain a designated red eye region, a red eye searching region determining section that determines a red eye searching region including therein the designated red eye region which is obtained by the red eye region designating section, a red eye candidate detecting section that searches for red eye within the red eye searching region which is determined by the red eye searching region determining section, to detect one or more red eye candidates, a face position detecting section that detects one of a position of a face and a position of an area of the face other than eyes within the red eye searching region which is determined by the red eye searching region determining section, and a red eye position judging section that selects, from the red eye candidates detected by the red eye candidate detecting section, a red eye candidate that is positioned at a predetermined position with respect to the position detected by the face position detecting section, as a red eye candidate to be subjected to a red eye correcting process.

The red eye detecting apparatus may further include a red eye correcting section that performs the red eye correcting process on the red eye candidate which is selected by the red eye position judging section so as to be subjected to the red eye correcting process.

Here, the red eye searching region determining section may determine a plurality of red eye searching regions each including therein the designated red eye region obtained by the red eye region designating section, the red eye candidate detecting section may search for red eye within each of the plurality of red eye searching regions which are determined by the red eye searching region determining section to detect one or more red eye candidates, and the face position detecting section may detect one of the position of the face and the position of the area of the face other than the eyes within the each of the plurality of red eye searching regions which are determined by the red eye searching region determining section. Here, the red eye searching region determining section may determine the plurality of red eye searching regions each having a substantially same aspect ratio as the designated red eye region obtained by the red eye region designating section. The red eye detecting apparatus may further include a searching region storing section that stores thereon a plurality of red eye searching regions having different sizes or shapes. Here, the red eye searching region determining section may determine the plurality of red eye searching regions which each include therein the designated red eye region obtained by the red eye region designating section and have same sizes or shapes as the plurality of red eye searching regions which are stored on the searching region storing section. With the above-described configurations, the user is no longer required to perform redundant work to designate a region in the image which includes the red-eye effect.

The red eye detecting apparatus may further include an aspect ratio storing section that stores thereon a plurality of different aspect ratios. Here, the red eye searching region determining section may determine the plurality of red eye searching regions which each include therein the designated red eye region obtained by the red eye region designating section and respectively have the plurality of different aspect ratios stored on the aspect ratio storing section. Here, the red eye position judging section may select, from a plurality of red eye candidates that are judged to be positioned at predetermined positions with respect to a plurality of positions of the face or a plurality of positions of the area of the face other than the eyes which are detected by the face position detecting section, a red eye candidate which has a largest overlapping area in the image with a corresponding one of the plurality of positions of the face or a corresponding one of the plurality of positions of the area of the face other than the eyes, as the red eye candidate to be subjected to the red eye correcting process. Here, the red eye candidate detecting section may include a first red eye searching section that searches for red eye within the red eye searching region by using a first parameter, to detect one or more red eye candidates, and a second red eye searching section that, when the first red eye searching section detects no red eye candidate within the red eye searching region, searches for red eye within the red eye searching region by using a second parameter different from the first parameter, to detect one or more red eye candidates.

Here, the first red eye searching section may search for red eye to detect one or more red eye candidates by successively moving a searching position by a first pixel distance within the red eye searching region, and the second red eye searching section may search for red eye to detect one or more red eye candidates by successively moving a searching position by a second pixel distance different from the first pixel distance within the red eye searching region. Here, the red eye searching region determining section may include an eye detecting section that detects a positional relation between the eyes based on the designated red eye region obtained by the red eye region designating section, and a face region identifying section that identifies a region of the face based on the positional relation between the eyes which is detected by the eye detecting section. Here, the red eye searching region determining section may determine the red eye searching region including therein the region of the face which is identified by the face region identifying section. Here, the red eye searching region determining section may include an eye detecting section that detects sizes of the eyes based on the designated red eye region obtained by the red eye region designating section, and a face region identifying section that identifies a region of the face based on the sizes of the eyes which are detected by the eye detecting section. Here, the red eye searching region determining section may determine the red eye searching region including therein the region of the face which is identified by the face region identifying section.

A second embodiment of the present invention provides a red eye detecting method including causing a user to designate a red eye region in an image so as to obtain a designated red eye region, determining a red eye searching region including therein the designated red eye region which is obtained in the user designating, searching for red eye within the red eye searching region which is determined in the determining, to detect one or more red eye candidates, detecting one of a position of a face and a position of an area of the face other than eyes within the red eye searching region which is determined in the determining, and selecting, from the red eye candidates detected in the searching, a red eye candidate that is positioned at a predetermined position with respect to the position detected in the detecting, as a red eye candidate to be subjected to a red eye correcting process.

A third embodiment of the present invention provides a red eye detecting program stored on a computer readable medium for a red eye detecting apparatus that detects red eye included in an image. The red eye detecting program stored on a computer readable medium causes the red eye detecting apparatus to function as a red eye region designating section that causes a user to designate a red eye region in the image so as to obtain a designated red eye region, a red eye searching region determining section that determines a red eye searching region including therein the designated red eye region which is obtained by the red eye region designating section, a red eye candidate detecting section that searches for red eye within the red eye searching region which is determined by the red eye searching region determining section, to detect one or more red eye candidates, a face position detecting section that detects one of a position of a face and a position of an area of the face other than eyes within the red eye searching region which is determined by the red eye searching region determining section, and a red eye position judging section that selects, from the red eye candidates detected by the red eye candidate detecting section, a red eye candidate that is positioned at a predetermined position with respect to the position detected by the face position detecting section, as a red eye candidate to be subjected to a red eye correcting process.

Effect of the Invention

According to an embodiment of the present invention, the red eye to be subjected to the red eye correcting process can be reliably detected without requiring a user to accurately designating the red eye region.

BEST MODE FOR CARRYING OUT THE INVENTION

Hereinafter, some embodiments of the present invention will be described. The embodiments do not limit the invention according to the claims, and all the combinations of the features described in the embodiments are not necessarily essential to means provided by aspects of the invention.

Figure 1:
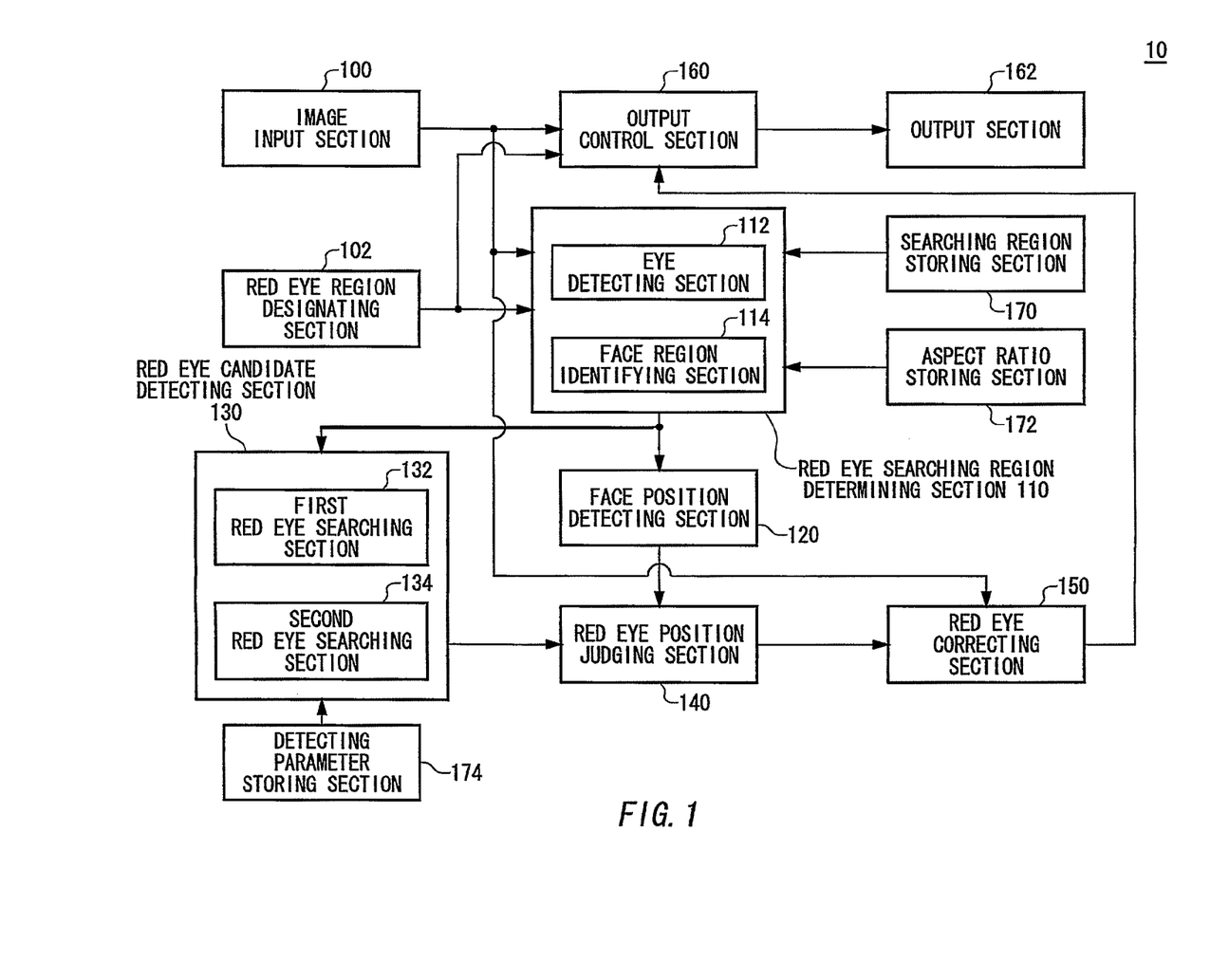
FIG. 1 is a block diagram illustrating the functional configuration of a red eye detecting apparatus 10.

FIG. 1 illustrates an exemplary functional configuration of a red eye detecting apparatus 10 relating to one embodiment of the present invention. The red eye detecting apparatus 10 includes therein an image input section 100, a red eye region designating section 102, a red eye searching region determining section 110, a face position detecting section 120, a red eye candidate detecting section 130, a red eye position judging section 140, a red eye correcting section 150, an output control section 160, an output section 162, a searching region storing section 170, an aspect ratio storing section 172, and a detecting parameter storing section 174. The red eye searching region determining section 110 includes therein an eye detecting section 112 and a face region identifying section 114. The red eye candidate detecting section 130 includes therein a first red eye searching section 132 and a second red eye searching section 134. An object of the red eye detecting apparatus 10 relating to the present embodiment is as follows. A user is not required to accurately designate a red eye candidate to be corrected. Instead, the red eye detecting apparatus 10 relating to the present embodiment automatically determines a red eye searching region, in an image, including therein a red eye region in the image which is designated by the user. In the determined red eye searching region, the red eye detecting apparatus 10 relating to the present embodiment automatically and highly accurately detect the red eye to be corrected.

The image input section 100 inputs an image into the red eye detecting apparatus 10 from an external device. The image input section 100 reads images printed on a photograph, a paper medium and the like, so as to input the images, as image data, into the red eye detecting apparatus 10 from the external device. The image input section 100 may input the image data via a storage medium such as a semiconductor memory, or a network such as LAN and the Internet. The image input section 100 supplies the image data to the red eye searching region determining section 110, red eye correcting section 150 and output control section 160.

The output control section 160 causes the output section 162 to output the image data as it is or after predetermined image processing has been performed on the image data, based on information received from the image input section 100, red eye region designating section 102, or red eye correcting section 150. The output section 162 outputs the image data under the control of the output control section 160. The output section 162 is, for example, an image display apparatus such as a monitor for displaying the image data, a writing apparatus for writing the image data into a storage medium such as a DVD, and a communicating section for transmitting the image data to a different image processing apparatus or the like. When the output section 162 is a monitor or the like, the output control section 160 converts the received image data into a visible image, and causes the output section 162 to display the visible image.

The red eye region designating section 102 obtains a designated red eye region by enabling the user to designate a red eye region in the image. Here, the designated red eye region may include at least part of the image input by the image input section 100, and be a region of the image which is judged by the user to include red eye. The designated red eye region may have a rectangular or substantially rectangular shape. The red eye region designating section 102 supplies information indicating the obtained designated red eye region to the red eye searching region determining section 110 and output control section 160. It should be noted here that the red eye indicates the red-eye or gold-eye effect.

The red eye searching region determining section 110 determines a red eye searching region including therein the designated red eye region received from the red eye region designating section 102. The red eye searching region determining section 110 may determine a plurality of red eye searching regions each including therein the designated red eye region. The red eye searching region determining section 110 may obtain the aspect ratio of the designated red eye region designated by the user based on the information indicating the designated red eye region which is received from the red eye region designating section 102, and determine a plurality of red eye searching regions each having substantially the same or same aspect ratio as the obtained aspect ratio. Here, the searching region storing section 170 stores thereon a plurality of red eye searching regions which have different sizes and/or shapes. The searching region storing section 170 may store thereon a plurality of red eye searching regions having different aspect ratios.

The red eye searching region determining section 110 may determine a plurality of red eye searching regions whose sizes and/or shapes are the same as those of the red eye searching regions stored on the searching region storing section 170 and which each include the designated red eye region which is received from the red eye region designating section 102. Here, the aspect ratio storing section 172 stores thereon a plurality of different aspect ratios. The aspect ratio storing section 172 may store thereon aspect ratios which are statistically calculated based on human faces. The red eye searching region determining section 110 may determine a plurality of red eye searching regions which each include the designated red eye region and have the plurality of aspect ratios stored on the aspect ratio storing section 172.

When determining a first red eye searching region including therein the designated red eye region, the red eye searching region determining section 110 may further determine a second red eye searching region whose position is shifted by a predetermined distance from the position of the first red eye searching region in the image. Here, the predetermined distance is equal to or shorter than the diameter of a red eye template image which is to be used by the red eye candidate detecting section 130. The red eye searching region determining section 110 may determine a plurality of different distances which are all equal to or shorter than the diameter of the red eye template image which is to be used by the red eye candidate detecting section 130, and determine a plurality of red eye searching regions based on the determined plurality of distances. The second red eye searching region may be shifted, with respect to the first red eye searching region, in the direction along the long side, short side or one of the diagonal lines of the red eye searching regions.

The eye detecting section 112 included in the red eye searching region determining section 110 detects the positional relation between the eyes or the sizes of the eyes based on the designated red eye region which is received from the red eye region designating section 102. The positional relation between the eyes which is detected by the eye detecting section 112 may be a distance between one of the eyes and the other eye, and the positional relation of the eyes with respect to an area of the face other than the eyes. For example, the eye detecting section 112 detects the positions of the eyes in the designated red eye region by attempting to detect a match with a plurality of types of eye template images. The eye detecting section 112 calculates the distance between the eyes based on the detected positions of the eyes. In a similar manner, the eye detecting section 112 also detects the sizes of the eyes included in the designated red eye region by attempting to detect a match with a plurality of eye template images with different sizes. The eye detecting section 112 supplies the detected distance between the eyes or the sizes of the eyes to the face region identifying section 114.

The face region identifying section 114 identifies the region showing the face, based on the distance between the eyes or the sizes of the eyes which are received from the eye detecting section 112. To be specific, the face region identifying section 114 identifies the face region based on the size of the face which is statistically determined in accordance with the distance between the eyes or the sizes of the eyes which are received from the eye detecting section 112. For example, the face sizes may be statistically determined in advance based on the various distances between the eyes or based on the various sizes of the eyes, and the face region identifying section 114 may store thereon information indicating the determined face sizes. Here, the red eye searching region determining section 110 determines the red eye searching region that includes therein the face region identified by the face region identifying section 114. The red eye searching region determining section 110 supplies information indicating the determined red eye searching region to the face position detecting section 120 and red eye candidate detecting section 130. The face position detecting section 120 detects the position of an area of the face other than the eyes or the position of the face within the red eye searching region received from the red eye searching region determining section 110. When receiving a plurality of red eye searching regions from the red eye searching region determining section 110, the face position detecting section 120 detects the position of an area of the face other than the eyes or the position of the face within each of the received plurality of red eye searching regions. The face position detecting section 120 supplies information indicating the detected position of the face or the detected position of the area of the face other than the eyes, to the red eye position judging section 140 in association with the image.

The red eye candidate detecting section 130 searches for red eye to detect a red eye candidate within the red eye searching region received from the red eye searching region determining section 110. When receiving a plurality of red eye searching regions from the red eye searching region determining section 110, the red eye candidate detecting section 130 searches for red eye to detect a red eye candidate within each of the received plurality of red eye searching regions. To be specific, the red eye candidate detecting section 130 searches for a red eye candidate by attempting to detect a match with red eye template images each having a predetermined shape and a color included in a predetermined color range. Here, the detecting parameter storing section 174 stores thereon a plurality of types of searching conditions used when the red eye candidate detecting section 130 searches for red eye. For example, the detecting parameter storing section 174 stores thereon a plurality of types of red eye template images used for the red eye search, as the red eye searching conditions. The red eye template images include a plurality of red eye template images having different sizes, a plurality of red eye template images having different shapes, and a plurality of red eye template images having different types of hues. The red eye candidate detecting section 130 may successively move, on the image, the red eye template image by a predetermined distance. Here, the detecting parameter storing section 174 stores thereon a plurality of different moving distances used when the red eye candidate detecting section 130 moves the red eye template image on the image, and a plurality of different starting positions used when the red eye candidate detecting section 130 moves the red eye template image on the image.

Note that the first red eye searching section 132 searches for red eye within the red eye searching region to detect a red eye candidate by using a first parameter stored on the detecting parameter storing section 174. On the other hand, the second red eye searching section 134 extracts a second parameter different from the first parameter from the detecting parameter storing section 174. The second red eye searching section 134 uses the extracted second parameter to search for red eye within the red eye searching region to detect a red eye candidate. For example, the first red eye searching section 132 searches for red eye, within the red eye searching region, by successively moving the searching position by a first pixel distance which is extracted from the detecting parameter storing section 174, so as to detect a red eye candidate. Subsequently, the second red eye searching section 134 searches for red eye, within the red eye searching region, by successively moving the searching position by a second pixel distance which is also extracted from the detecting parameter storing section 174 but different from the first pixel distance, so as to detect a red eye candidate. Here, the second pixel distance which is extracted by the second red eye searching section 134 from the detecting parameter storing section 174 may be such a distance that the searching positions of the first red eye searching section 132 do not overlap the searching positions of the second red eye searching section 134. The red eye candidate detecting section 130 supplies information indicating the position of the detected red eye candidate, to the red eye position judging section 140.

The red eye position judging section 140 selects, from the red eye candidates received from the red eye candidate detecting section 130, a red eye candidate which is positioned at a predetermined position with respect to the position detected by the face position detecting section 120, as a red eye candidate to be subjected to a red eye correcting process. Specifically speaking, when receiving information indicating the position of the face within the red eye searching region from the face position detecting section 120, the red eye position judging section 140 selects a red eye candidate to be subjected to the red eye correcting process in the following manner. In detail, the red eye position judging section 140 prestores thereon statistically calculated eye positions in association with the faces. Based on this, the red eye position judging section 140 selects, as the red eye candidate to be subjected to the red eye correcting process, a red eye candidate which is positioned at the statistically calculated eye position. Alternatively, the red eye position judging section 140 may select, from a plurality of red eye candidates which are judged to be positioned at predetermined positions with respect to the positions of the face or the positions of the area of the face other than the eyes which are received from the face position detecting section 120, a red eye candidate which has the largest overlapping area in the image, as the red eye candidate to be subjected to the red eye correcting process. In the above-described manner, the red eye position judging section 140 can be prevented from selecting, as the red eye candidate to be subjected to the red eye correcting process, the inner and outer corners of the eyes and pimples, for example, which do not have the red-eye effect. Consequently, the red eye position judging section 140 can reliably perform selection on the red eye candidates.

The red eye position judging section 140 supplies information indicating the position in the image of the red eye candidate selected as the red eye candidate to be subjected to the red eye correcting process, to the red eye correcting section 150. Here, the red eye position judging section 140 may supply, in association with the image, the information indicating the position of the red eye candidate selected as the red eye candidate to be subjected to the red eye correcting process, to an image processing apparatus different from the red eye detecting apparatus 10 relating to the present embodiment. The image processing apparatus may perform the red eye correcting process on the image received from the red eye detecting apparatus 10 relating to the present embodiment, by reading the information indicating the position of the red eye candidate selected as the red eye candidate to be subjected to the red eye correcting process in association with the image. The red eye correcting section 150 performs the red eye correcting process on the red eye candidate, which is included in the image received from the image input section 100, based on the position of the red eye candidate which is received from the red eye position judging section 140. The red eye correcting section 150 supplies the image data on which the red eye correcting process has been performed, to the output control section 160.

The red eye detecting apparatus 10 relating to the present embodiment can automatically determine the red eye searching region including therein the designated red eye region which is designated by the user, and detect a red eye candidate within the determined red eye searching region. With this configuration, the red eye detecting apparatus 10 saves the user from performing a highly demanding operation of accurately designating the red eye candidate to be subjected to the red eye correcting process and from performing a redundant work. Instead, to automatically detect a red eye candidate to be subjected to the red eye correcting process, the red eye detecting apparatus 10 simply requires the user to easily designate a predetermined region. As a consequence, the red eye detecting apparatus 10 relating to the present embodiment can reliably detect a red eye candidate to be subjected to the red eye correcting process, irrespective of the level of the user's skills.

Also, the red eye detecting apparatus 10 relating to the present embodiment can automatically determine a plurality of red eye searching regions each including therein the designated red eye region designated by the user, and searches for a red eye candidate in each of the determined plurality of red eye searching regions. With this configuration, even when the user designates only one designated red eye region, the red eye detecting apparatus 10 can automatically determine a plurality of red eye searching regions to attempt to detect a red eye candidate. Therefore, when unable to detect a red eye candidate in a predetermined red eye searching region, the red eye detecting apparatus 10 can attempt to detect a red eye candidate in a different red eye searching region. As a consequence, the red eye detecting apparatus 10 can reliably detect a red eye candidate to be subjected to the red eye correcting process.

Figure 2:
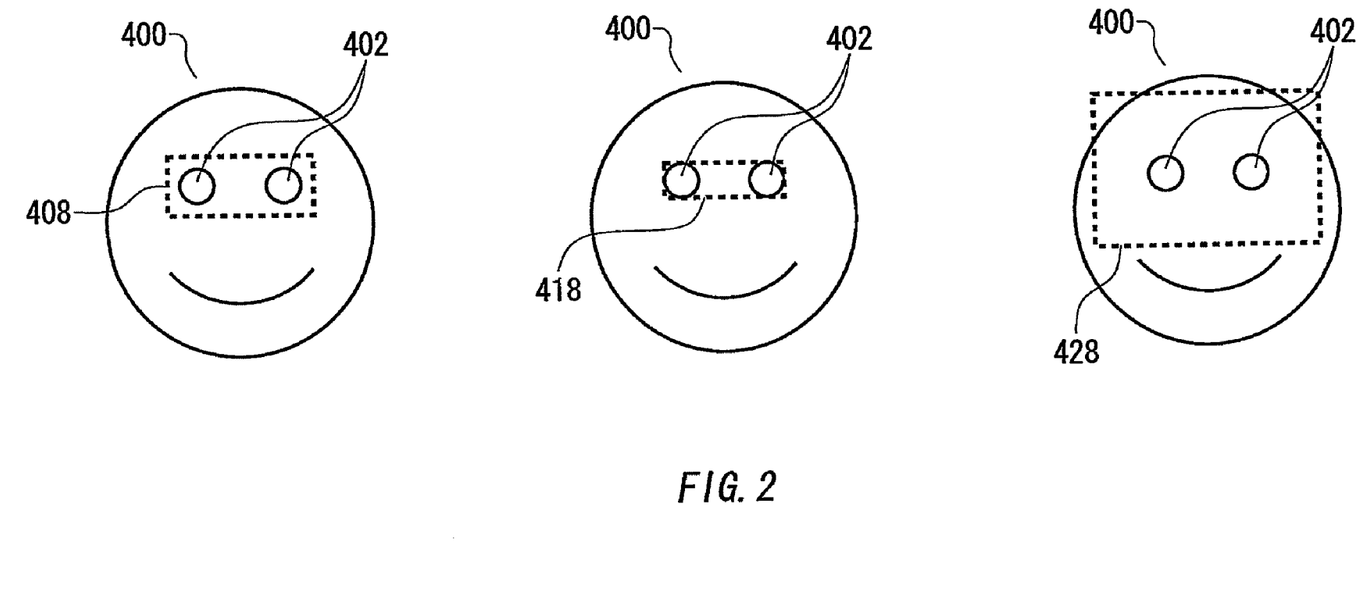
FIG. 2 illustrates designated red eye regions which are obtained by a red eye region designating section 102.

FIG. 2 illustrates exemplary designated red eye regions which are obtained by the red eye region designating section 102 relating to the present embodiment. The red eye region designating section 102 enables the user to designate a red eye region for the face of a person included in the image. In this way, the red eye region designating section 102 obtains the designated red eye region which is the red eye region designated by the user. In detail, the output control section1 160 converts the image data received from the image input section 100 into an image, and causes the output section 162 to display the image, to start with. Subsequently, the red eye region designating section 102 enables the user to designate a red eye region in the image displayed on the output section 162. To be specific, the red eye region designating section 102 may include therein an input device such as a mouse, a tablet, and a keyboard. The red eye region designating section 102 enables the user to designate the red eye region via the input device, to obtain the designated red eye region.

For example, the red eye region designating section 102 enables the user to designate a red eye region including therein red eye 402 of a face 400 shown in the image, to obtain one of designated red eye regions 408, 418 and 428. Here, the designated red eye region obtained by the red eye region designating section 102 may have a rectangular or substantially rectangular shape. Also, the designated red eye region obtained by the red eye region designating section 102 may have a size freely determined by the user. When the user designates freehand a red eye region with the use of the input device such as a mouse and a tablet, or when the user designates a red eye region which has a polygonal or substantially polygonal shape, for example, the red eye region designating section 102 may convert the red eye region designated by the user into a red eye region having a substantially rectangular shape, and obtain the resulting region as the designated red eye region. To be specific, the red eye region designating section 102 may obtain, as the designated red eye region, a rectangular or substantially rectangular region circumscribing the region designated by the user.

Figure 3:
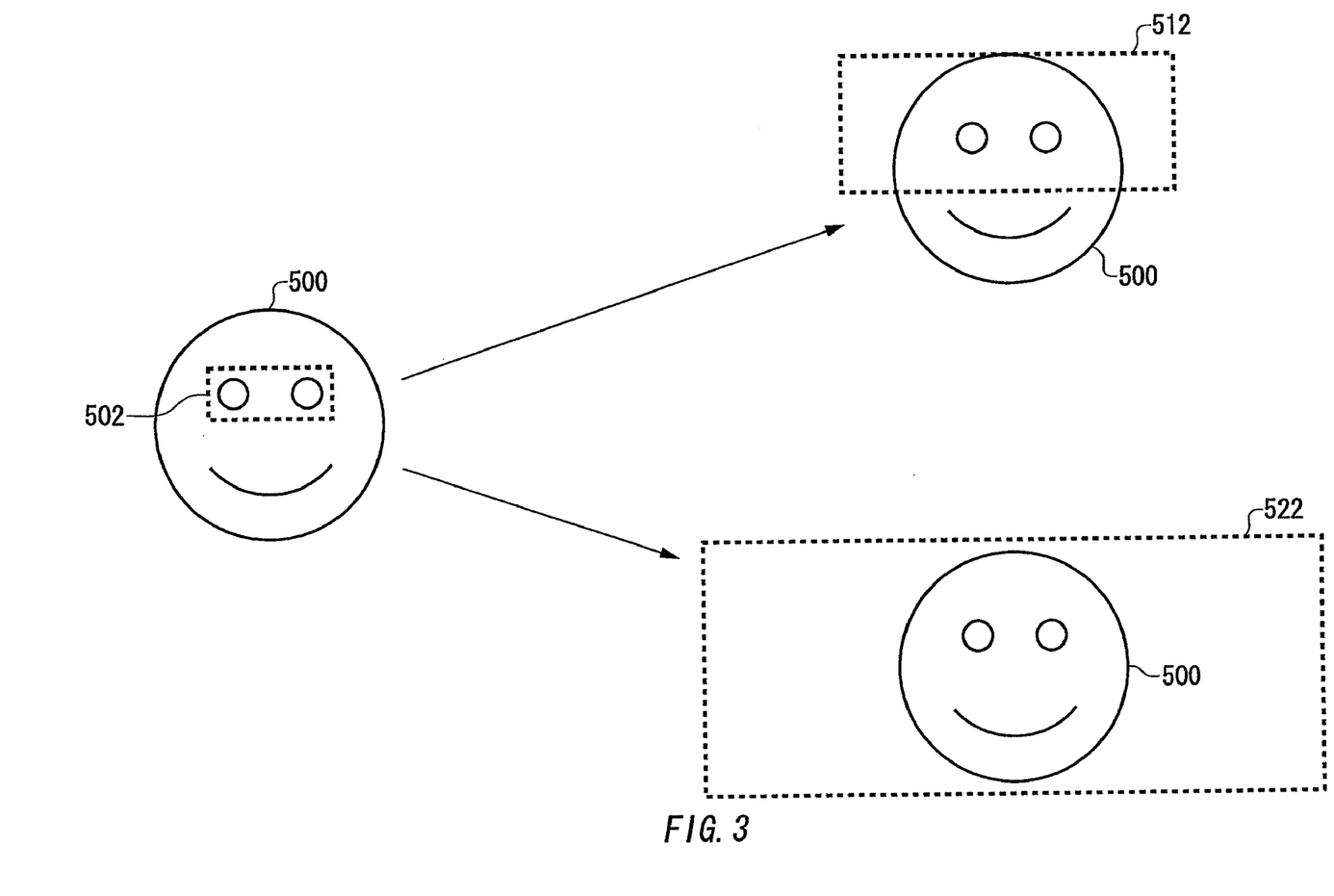
FIG. 3 is used to illustrate the operation performed by a red eye searching region determining section 110.

FIG. 3 is used to illustrate an exemplary operation performed by the red eye searching region determining section 110 relating to the present embodiment. The red eye searching region determining section 110 determines a red eye searching region 512 or 522 including therein a designated red eye region 502 that is included in a face 500 of a person. The designated red eye region 502 is obtained by the red eye region designating section 102. Specifically speaking, the red eye searching region determining section 110 determines the red eye searching region 512 or 522 which has the same or substantially the same aspect ratio as the designated red eye region 502 and has a sufficient size to include therein the designated red eye region 502. For example, the red eye searching region determining section 110 enlarges the designated red eye region 502 at a predetermined enlarging ratio, by using as the base point the position of the barycenter of the rectangular designated red eye region 502, in the direction extending from the position of the barycenter towards the outside of the rectangular designated red eye region 502. The red eye searching region determining section 110 may determine the red eye searching region 512 or 522 in the above-described manner. Here, the red eye searching region determining section 110 may extract the enlarging ratio used to enlarge the designated red eye region 502 from the searching region storing section 170.

Here, the red eye searching regions 512 and 522 which may be determined by the red eye searching region determining section 110 may have different sizes. The red eye searching region 512 or 522 determined by the red eye searching region determining section 110 may be a region which is generated by varying the size of the designated red eye region with being kept at the original position of the designated red eye region, and has the same or substantially the same aspect ratio as the aspect ratio of the designated red eye region. The red eye searching region determining section 110 may generate a plurality of red eye searching regions, taking into consideration the throughput of the red eye detecting apparatus 10 (such as the memory resource, the time period required to complete the red eye correcting process, and the utilization of the CPU). Specifically speaking, the red eye searching region determining section 110 may determine more red eye searching regions when the throughput of the red eye detecting apparatus 10 is higher than a predetermined throughput, than when the throughput of the red eye detecting apparatus 10 is lower than the predetermined throughput.

Figure 4:
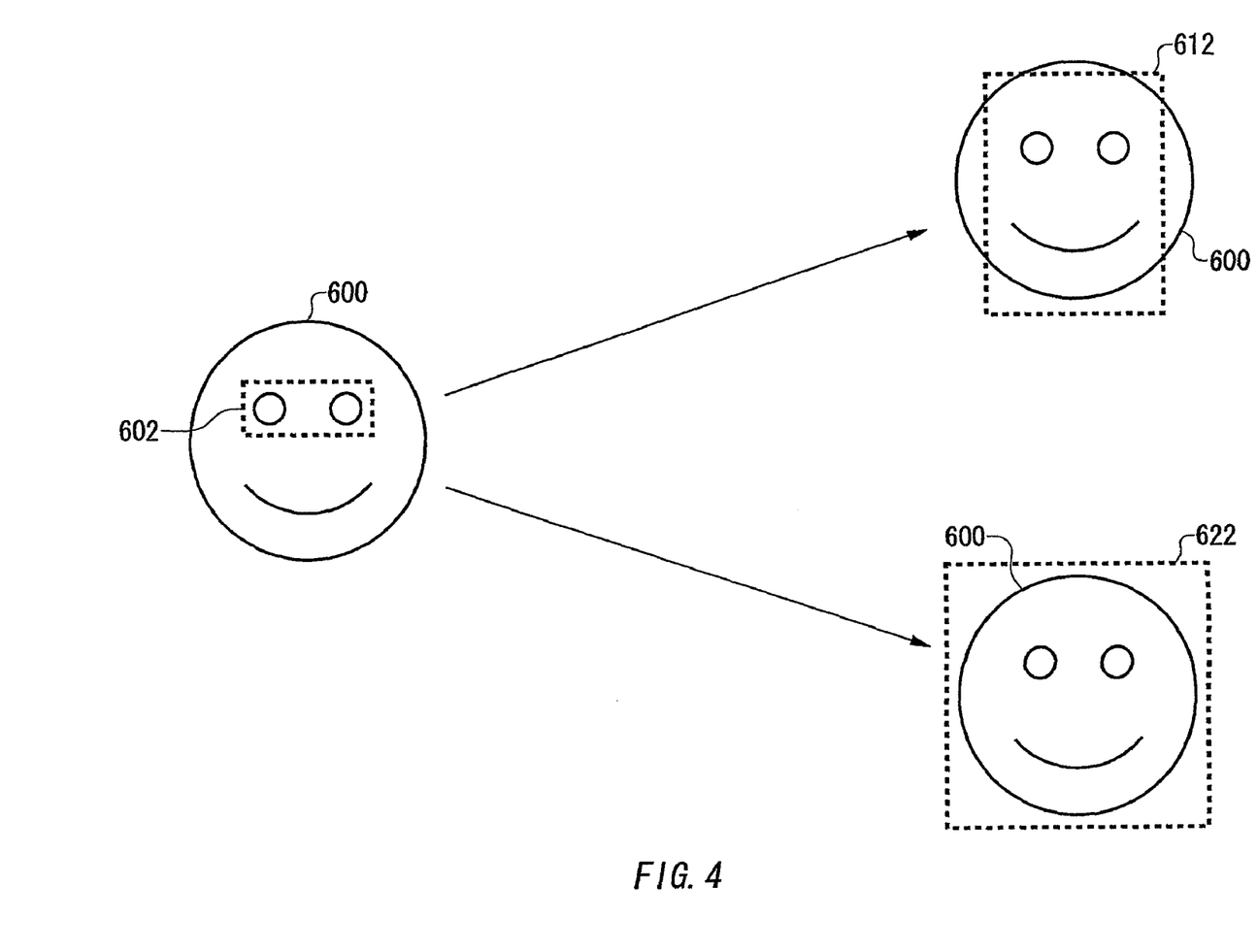
FIG. 4 is used to illustrate the operation performed by the red eye searching region determining section 110.

FIG. 4 is used to illustrate an exemplary operation performed by the red eye searching region determining section 110 relating to the present embodiment. The red eye searching region determining section 110 determines a red eye searching region 612 or 622 including therein a designated red eye region 602 that is included in a face 600 of a person. The designated red eye region 602 is obtained by the red eye region designating section 102. Specifically speaking, the red eye searching region determining section 110 determines the red eye searching region 612 or 622 which has a different aspect ratio from the aspect ratio of the designated red eye region 602 and has a sufficient size to include therein the designated red eye region 602. For example, the red eye searching region determining section 110 extracts, from the plurality of different aspect ratios stored on the aspect ratio storing section 172, a plurality of aspect ratios the number of which is determined in accordance with the throughput of the red eye detecting apparatus 10. In detail, the red eye searching region determining section 110 extracts more aspect ratios when the memory resource of the red eye detecting apparatus 10 is larger than a predetermined threshold value, than when the memory resource of the red eye detecting apparatus 10 is smaller than the predetermined threshold value. The red eye searching region determining section 110 determines the red eye searching region 612 or 622 by increasing or decreasing the vertical and horizontal lengths of the designated red eye region 602 based on the extracted aspect ratios.

Figure 5:
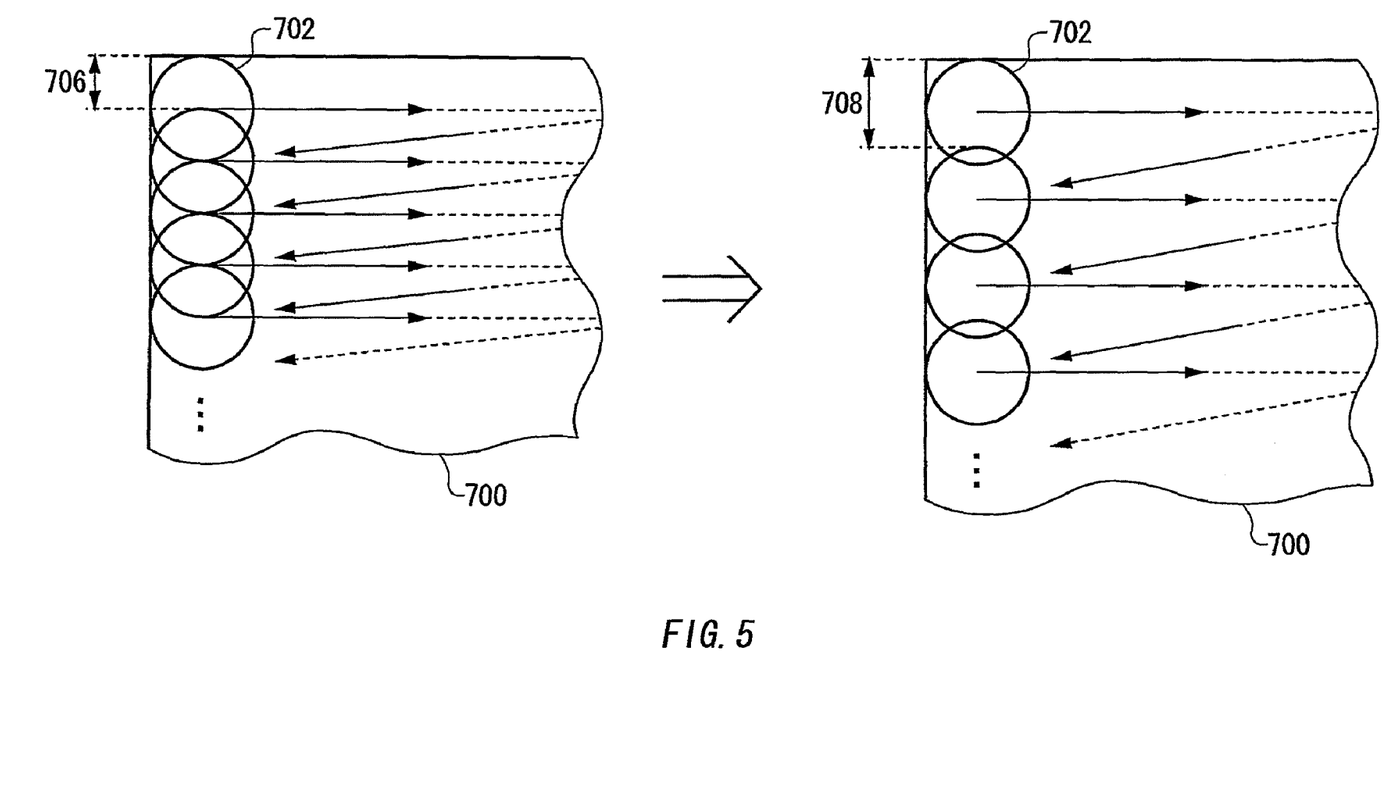
FIG. 5 is used to illustrate the operation performed by a red eye candidate detecting section 130.

FIG. 5 is used to illustrate an exemplary operation performed by the red eye candidate detecting section 130 relating to the present embodiment. The red eye candidate detecting section 130 searches for red eye within the red eye searching region determined by the red eye searching region determining section 110, to detect a red eye candidate. For example, the red eye candidate detecting section 130 successively moves, within the red eye searching region, a red eye template image by a predetermined pixel distance from the corner of the red eye searching region. By doing this, the red eye candidate detecting section 130 may attempt to detect a match in order to detect a red eye candidate. Here, the red eye candidate detecting section 130 uses a plurality of different pixel distances to detect a match, in order to avoid a case where there is a red eye candidate but the red eye template image does not match the red eye candidate because of an inappropriate pixel distance.

Specifically speaking, the red eye candidate detecting section 130 searches for red eye by successively moving a red eye template image 702 by a first pixel distance 706 within a red eye searching region 700, so as to detect a red eye candidate. If the red eye candidate detecting section 130 can not detect a red eye candidate by using the first pixel distance 706, the red eye candidate detecting section 130 subsequently searches for red eye by successively moving the red eye template image 702 by a second pixel distance 708 which is different from the first pixel distance 706, within the red eye searching region 700, so as to detect a red eye candidate. The red eye candidate detecting section 130 may sequentially use a different pixel distance until detecting a red eye candidate within the red eye searching region 700. For example, the red eye candidate detecting section 130 first attempts to detect a match by using the first pixel distance 706, and then attempts to detect a match by using the second pixel distance 708 which differs from the first pixel distance 706 by a value equal to or less than the diameter of the red eye template image 702. The red eye candidate detecting section 130 may determine a plurality of distances which are differentiated in units of a value equal to or less than the diameter of the red eye template image 702, and attempt to detect a match by using the plurality of different distances until detecting a red eye candidate.

Also, when unable to detect a red eye candidate by using a first red eye template image, the red eye candidate detecting section 130 may attempt to detect a red eye candidate by using a second red eye template image that is different in terms of a certain parameter from the first red eye template image. Here, the parameter of the red eye template image may be at least one of the size, shape and color of the red eye template image. For example, when unable to detect a red eye candidate by using the first red eye template image, the red eye candidate detecting section 130 attempts to detect a red eye candidate by using the second red eye template image which has a different color from the first red eye template image. The red eye candidate detecting section 130 may sequentially vary the parameter of the red eye template image until detecting a red eye candidate, so as to detect a red eye candidate in the red eye searching region.

The red eye candidate detecting section 130 starts attempting to detect a match with the use of the red eye template image 702, by moving the red eye template image 702 from a first starting position that is determined in advance within the red eye searching region. For example, the red eye candidate detecting section 130 attempts to detect a red eye candidate by moving the red eye template image 702 from the first starting position at which the edges of the red eye searching region 700 are in contact with the red eye template image 702. When unable to detect a red eye candidate, the red eye candidate detecting section 130 determines a second starting position which is positioned away from the corner of the red eye searching region 700 by a predetermined distance that is shorter than the moving distance of the red eye template image 702, for example, the first pixel distance 706.

Specifically speaking, the second starting position determined by the red eye candidate detecting section 130 may be positioned away from the corner of the red eye searching region 700 by a predetermined distance that is equal to or shorter than the pixel distance 706 used when the red eye template image 702 is moved. Following this, the red eye candidate detecting section 130 starts to move the red eye template image 702 from the second starting position, so as to detect a red eye candidate. In this manner, the red eye candidate detecting section 130 may attempt to detect a match by sequentially vary the starting position of the red eye template image 702 within the range of the value of the first pixel distance 706 until detecting a red eye candidate. The red eye candidate detecting section 130 may shift the starting position of the red eye template image 702 in units of one pixel. With the above-described configuration, the red eye candidate detecting section 130 relating to the present embodiment can reliably detect a red eye candidate in the image.

Figure 6:
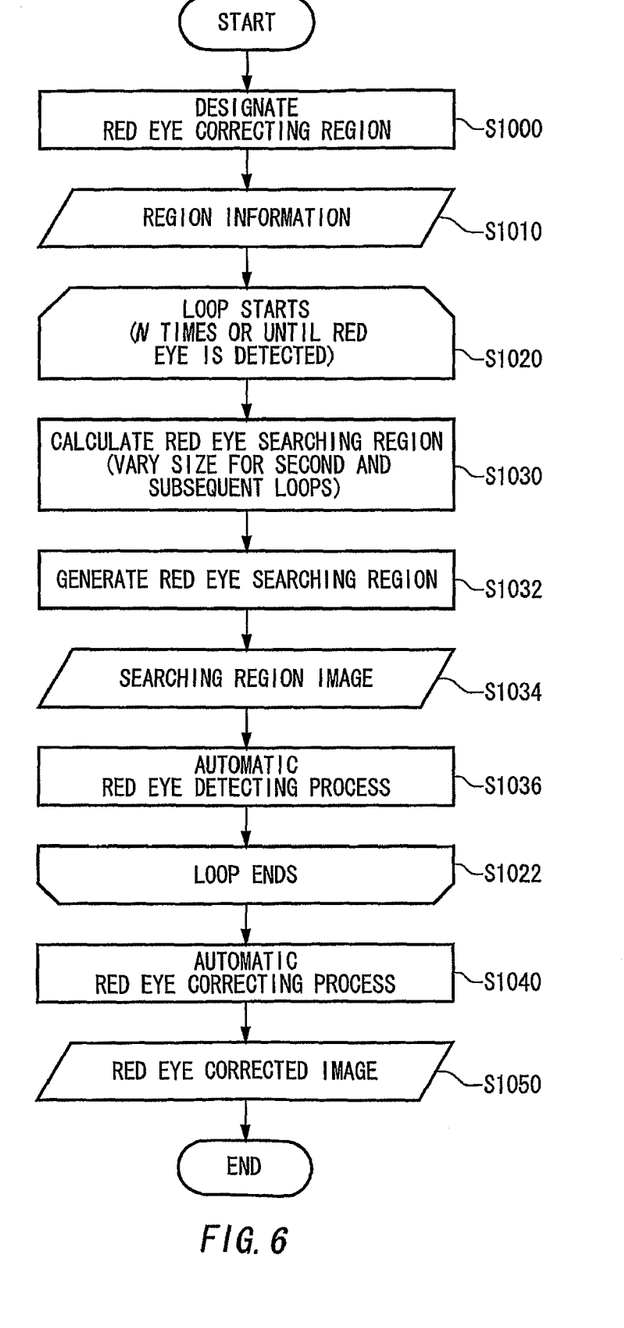
FIG. 6 is a flow chart illustrating the flow of the process performed by the red eye detecting apparatus 10.

FIG. 6 illustrates an exemplary flow of the process performed by the red eye detecting apparatus 10 relating to the present embodiment. To begin with, the red eye region designating section 102 enables the user to designate a red eye correcting region (S1000). The red eye region designating section 102 supplies the red eye correcting region which is designated by the user to the red eye searching region determining section 110. Here, the red eye correcting region is one example of the above-described designated red eye region. When the user designates the red eye correcting region (S1000), the red eye region designating section 102 obtains region information relating to the red eye correcting region which is designated by the user (S1010). The region information relating to the red eye correcting region may indicate the position occupied by the red eye correcting region in the image, for example.

Subsequently, the red eye detecting process is repeatedly performed, until the red eye position judging section 140 detects a red eye candidate to be subjected to the red eye correcting process, or the predetermined number of times (for example, N times) (S1020). Specifically speaking, the red eye searching region determining section 110 calculates a red eye searching region including therein the red eye correcting region received from the red eye region designating section 102, based on the predetermined conditions stored on the searching region storing section 170 or aspect ratio storing section 172 (S1030). When the red eye detecting process is repeatedly performed, the red eye searching region determining section 110 calculates the red eye searching region based on a different or varied condition, compared with the preceding loop of the red eye detecting process (S1030).

The red eye searching region determining section 110 generates a red eye searching region based on the calculated red eye searching region (S1032). The red eye searching region determining section 110 may use the generated red eye searching region as a searching region image (S1034). The red eye searching region determining section 110 supplies the searching region image to the face position detecting section 120 and red eye candidate detecting section 130. The face position detecting section 120 detects the position of the face or the position of an area of the face other than the eyes in the searching region image. The face position detecting section 120 supplies the detected position of the face or the detected position of the area of the face other than the eyes, to the red eye position judging section 140.

On the other hand, the red eye candidate detecting section 130 attempts to detect a red eye candidate within the searching region image. For example, when attempting to detect a red eye candidate by attempting to detect a match with the use of a red eye template image, the red eye candidate detecting section 130 searches for a red eye candidate by using a first red eye template image. When unable to detect a red eye candidate with the first red eye template image, the red eye candidate detecting section 130 searches for a red eye candidate by using a second red eye template image which is different from the first red eye template image in terms of a certain parameter. The red eye candidate detecting section 130 may sequentially vary the parameter of the red eye template image until detecting a red eye candidate. The red eye candidate detecting section 130 supplies information indicating the position of the detected red eye candidate, to the red eye position judging section 140. The red eye position judging section 140 selects a red eye candidate to be subjected to the red eye correcting process from a plurality of red eye candidates included in the image (S1036). When the red eye position judging section 140 selects the red eye candidate to be subjected to the red eye correcting process, the red eye detecting process loop ends (S1022).

Subsequently, the red eye correcting section 150 performs an automatic red eye correcting process on the red eye candidate selected by the red eye position judging section 140 to be subjected to the red eye correcting process (S1040). After this, the red eye detecting apparatus 10 obtains a red eye corrected image generated as a result of the red eye correcting process, as image data (S1050). Here, when the red eye position judging section 140 selects a red eye candidate to be subjected to the red eye correcting process, the red eye detecting apparatus 10 may store thereon the position, in the image, of the selected red eye candidate in association with the image, as the image data. The red eye position judging section 140 may cause the output section 162 to output the image data via the output control section 160. For example, the output section 162 may record the image data onto a recording medium such as a memory. Alternatively, the output section 162 may supply the image data to a different image processing apparatus, so as to cause the different image processing apparatus to perform the red eye correcting process on the image data.

Figure 7:
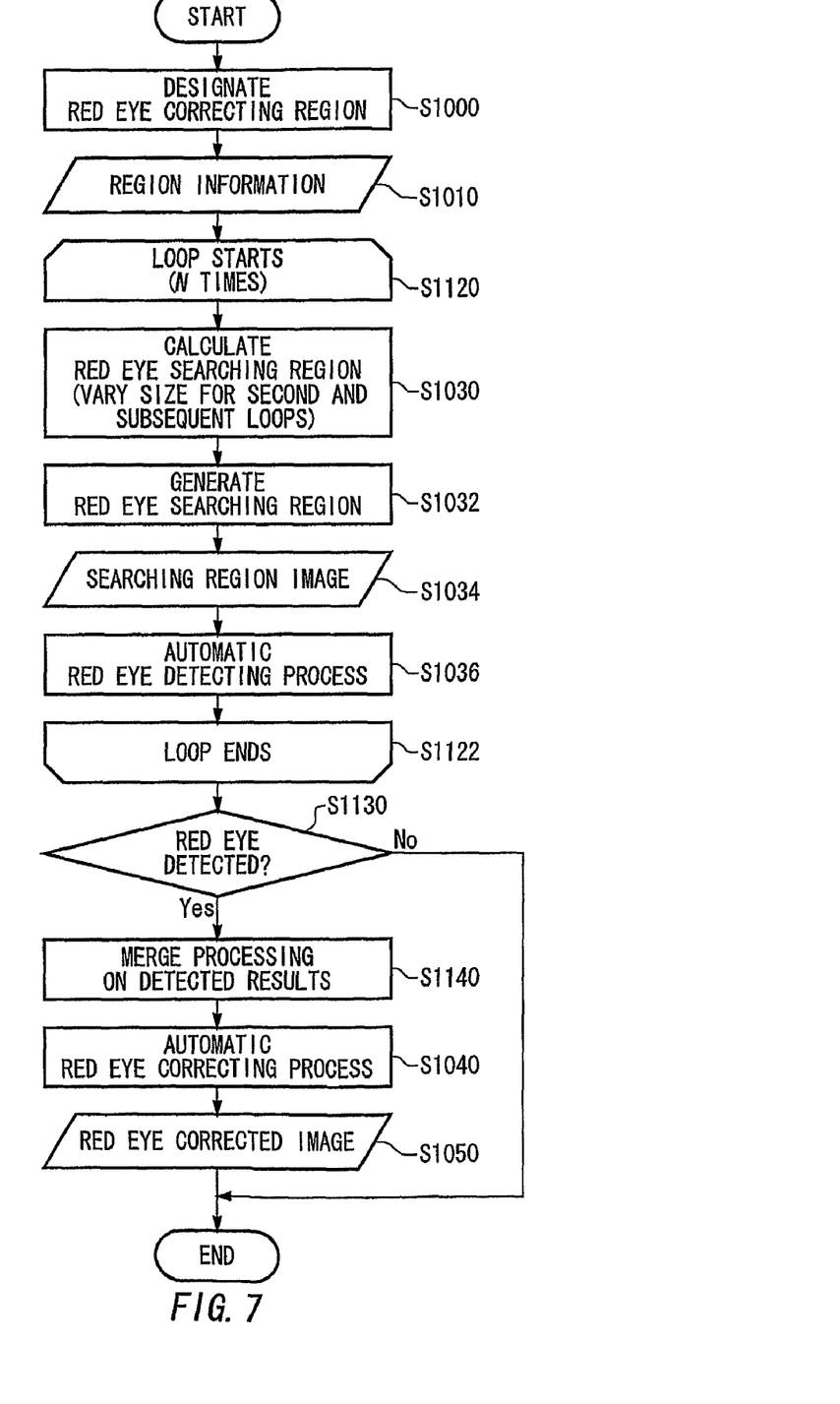
FIG. 7 is a flow chart illustrating the flow of the process performed by the red eye detecting apparatus 10.

FIG. 7 illustrates an exemplary flow of the process performed by the red eye detecting apparatus 10 relating to the present embodiment. In FIG. 7, the steps assigned with the same reference numerals as in FIG. 6 are performed in substantially the same manner as the corresponding steps included in the flow chart shown in FIG. 6, and therefore not explained in detail in the following. The red eye position judging section 140 repeatedly performs the red eye detecting process the predetermined number of times (for example, N times) (S1120). When performing the red eye detecting process the predetermined number of times in an attempt to detect a red eye candidate to be subjected to the red eye correcting process (S1122), the red eye position judging section 140 judges whether any red eye candidate to be subjected to the red eye correcting process has been detected (S1130). When the red eye position judging section 140 judges negatively (S1130:No), the process ends.

On the other hand, when judging positively (S1130:Yes), the red eye position judging section 140 performs a merge processing on a plurality of detected results (S1140). For example, the red eye position judging section 140 selects, from the detected plurality of red eye candidates, a red eye candidate having the largest overlapping area in the image, as the red eye candidate to be subjected to the red eye correcting process. Alternatively, the red eye position judging section 140 may select a red eye candidate to be subjected to the red eye correcting process, based on the relation of the positions of the detected plurality of red eye candidates with respect to the position of an area of the face other than the eyes which is detected by the face position detecting section 120. The red eye correcting section 150 performs the red eye correcting process on the red eye candidate selected by the red eye position judging section 140 to be subjected to the red eye correcting process (S1040).

Figure 8:
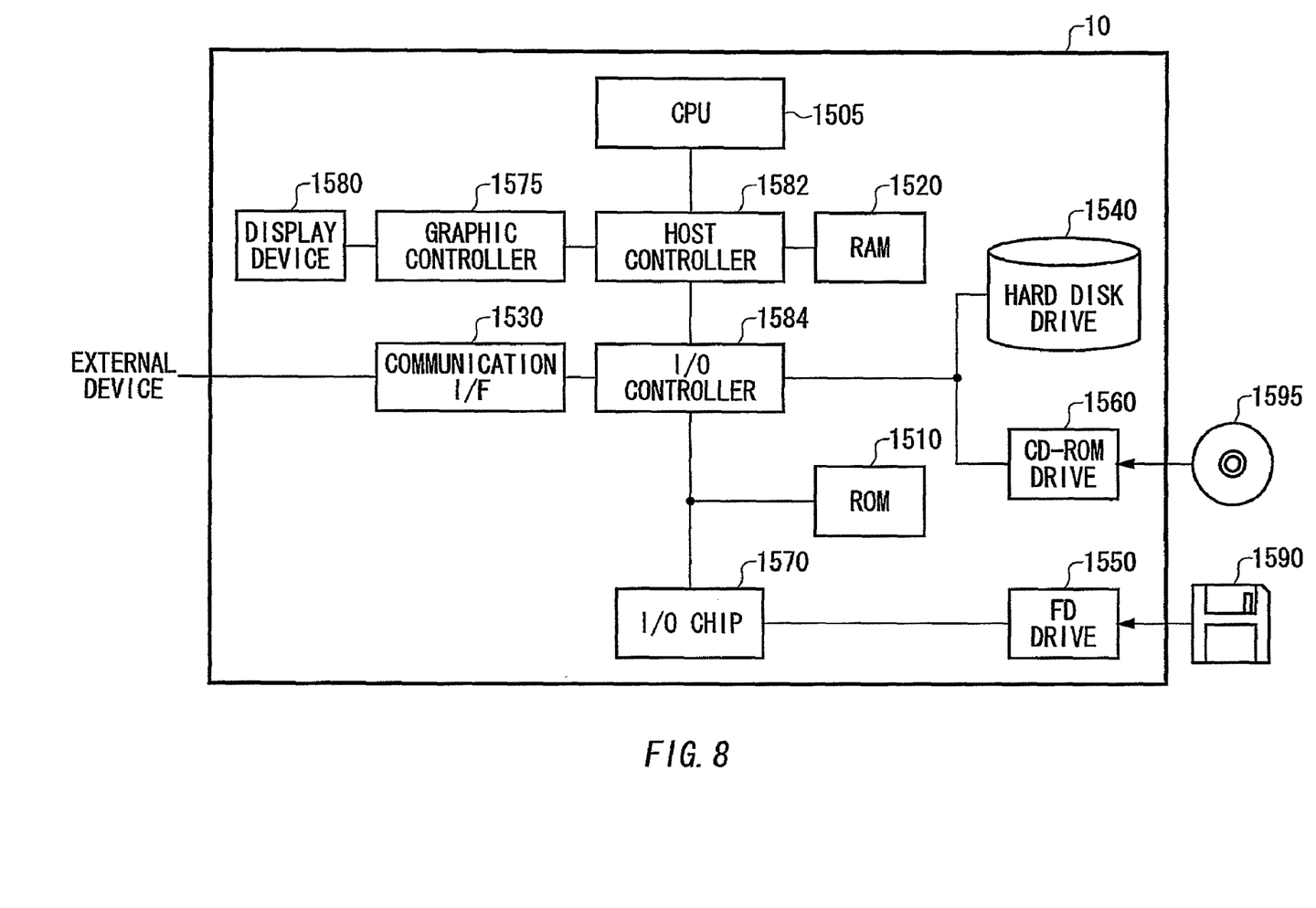
FIG. 8 is a block diagram illustrating the hardware configuration of the red eye detecting apparatus 10.

FIG. 8 illustrates an exemplary hardware configuration of the red eye detecting apparatus 10 relating to the present embodiment. The red eye detecting apparatus 10 is constituted by a CPU surrounding section, an input/output (I/O) section and a legacy I/O section. The CPU surrounding section includes a CPU 1505, a RAM 1520, a graphic controller 1575, and a display device 1580 which are connected to each other by means of a host controller 1582. The I/O section includes a communication interface 1530, a hard disk drive 1540, and a CD-ROM drive 1560 which are connected to the host controller 1582 by means of an I/O controller 1584. The legacy I/O section includes a ROM 1510, a flexible disk drive 1550, and an I/O chip 1570 which are connected to the I/O controller 1584.

The host controller 1582 connects the RAM 1520 with the CPU 1505 and graphic controller 1575 which access the RAM 1520 at a high transfer rate. The CPU 1505 operates in accordance with programs stored on the ROM 1510 and RAM 1520, to control the constituents. The graphic controller 1575 obtains image data which is generated by the CPU 1505 or the like on a frame buffer provided within the RAM 1520, and causes the display device 1580 to display the obtained image data. Alternatively, the graphic controller 1575 may include therein a frame buffer for storing thereon image data generated by the CPU 1505 or the like.

The I/O controller 1584 connects, to the host controller 1582, the communication interface 1530, hard disk drive 1540 and CD-ROM drive 1560 which are I/O devices operating at a relatively high rate. The communication interface 1530 communicates with a difference device via a network. The hard disk drive 1540 stores thereon programs and data to be used by the CPU 1505 provided in the red eye detecting apparatus 10. The CD-ROM drive 1560 reads programs or data from a CR-ROM 1595, and supplies the read programs or data to the hard disk drive 1540 via the RAM 1520.

The I/O controller 1584 is also connected to the ROM 1510, flexible disk drive 1550 and I/O chip 1570 which are I/O devices operating at a relatively low rate. The ROM 1510 stores thereon a boot program executed by the red eye detecting apparatus 10 at the start up, programs unique to the hardware of the red eye detecting apparatus 10, and the like. The flexible disk drive 1550 reads programs or data from a flexible disk 1590, and supplies the read programs or data to the hard disk drive 1540 via the RAM 1520. The I/O chip 1570 is used to connect a variety of I/O devices such as the flexible disk drive 1550 via, for example, a parallel port, a serial port, a keyboard port, a mouse port or the like, A red eye detecting program stored on a computer readable medium to be supplied to the hard disk drive 1540 via the RAM 1520 is provided by a user in a state of being stored on a recording medium such as the flexible disk 1590, CD-ROM 1595 and an IC card. The red eye detecting program stored on a computer readable medium is read from the recording medium, installed via the RAM 1520 in the hard disk drive 1540 in the red eye detecting apparatus 10, and executed by the CPU 1505. The red eye detecting program stored on a computer readable medium to be installed in and thus executed by the red eye detecting apparatus 10 causes the CPU 1505 and the like to operate the red eye detecting apparatus 10 as the image input section 100, red eye region designating section 102, red eye searching region determining section 110, eye detecting section 112, face region identifying section 114, face position detecting section 120, red eye candidate detecting section 130, first red eye searching section 132, second red eye searching section 134, red eye position judging section 140, red eye correcting section 150, output control section 160, output section 162, searching region storing section 170, aspect ratio storing section 172, and detecting parameter storing section 174 described with reference to FIGS. 1 to 7.

While the embodiments of the present invention have been described, the technical scope of the invention is not limited to the above described embodiments. It is apparent to persons skilled in the art that various alternations and improvements can be added to the above-described embodiment. It is also apparent from the scope of the claims that the embodiments added with such alternations or improvements can be included in the technical scope of the invention.

The invention claimed is:

1. A red eye detecting apparatus comprising:
a red eye region designating section that causes a user to designate a red eye region in an image so as to obtain a designated red eye region;
a red eye searching region determining section that determines a red eye searching region including therein the designated red eye region which is obtained by the red eye region designating section;
a red eye candidate detecting section that searches for red eye within the red eye searching region which is determined by the red eye searching region determining section, to detect one or more red eye candidates;
a face position detecting section that detects one of a position of a face and a position of an area of the face other than eyes within the red eye searching region which is determined by the red eye searching region determining section; and
a red eye position judging section that selects, from the red eye candidates detected by the red eye candidate detecting section, a red eye candidate that is positioned at a predetermined position with respect to the position detected by the face position detecting section, as a red eye candidate to be subjected to a red eye correcting process.

2. The red eye detecting apparatus as set forth in claim 1, further comprising
a red eye correcting section that performs the red eye correcting process on the red eye candidate which is selected by the red eye position judging section so as to be subjected to the red eye correcting process.

3. The red eye detecting apparatus as set forth in claim 1, wherein
the red eye searching region determining section determines a plurality of red eye searching regions each including therein the designated red eye region obtained by the red eye region designating section,
the red eye candidate detecting section searches for red eye within each of the plurality of red eye searching regions which are determined by the red eye searching region determining section to detect one or more red eye candidates, and
the face position detecting section detects one of the position of the face and the position of the area of the face other than the eyes within the each of the plurality of red eye searching regions which are determined by the red eye searching region determining section.

4. The red eye detecting apparatus as set forth in claim 3, wherein
the red eye searching region determining section determines the plurality of red eye searching regions each having a substantially same aspect ratio as the designated red eye region obtained by the red eye region designating section.

5. The red eye detecting apparatus as set forth in claim 3, further comprising
a searching region storing section that stores thereon a plurality of red eye searching regions having different sizes or shapes, wherein
the red eye searching region determining section determines the plurality of red eye searching regions which each include therein the designated red eye region obtained by the red eye region designating section and have same sizes or shapes as the plurality of red eye searching regions which are stored on the searching region storing section.

6. The red eye detecting apparatus as set forth in claim 3, further comprising
an aspect ratio storing section that stores thereon a plurality of different aspect ratios, wherein
the red eye searching region determining section determines the plurality of red eye searching regions which each include therein the designated red eye region obtained by the red eye region designating section and respectively have the plurality of different aspect ratios stored on the aspect ratio storing section.

7. The red eye detecting apparatus as set forth in claim 3, wherein
the red eye position judging section selects, from a plurality of red eye candidates that are judged to be positioned at predetermined positions with respect to a plurality of positions of the face or a plurality of positions of the area of the face other than the eyes which are detected by the face position detecting section, a red eye candidate which has a largest overlapping area in the image with a corresponding one of the plurality of positions of the face or a corresponding one of the plurality of positions of the area of the face other than the eyes, as the red eye candidate to be subjected to the red eye correcting process.

8. The red eye detecting apparatus as set forth in claim 1, wherein
the red eye candidate detecting section includes:
a first red eye searching section that searches for red eye within the red eye searching region by using a first parameter, to detect one or more red eye candidates; and
a second red eye searching section that, when the first red eye searching section detects no red eye candidate within the red eye searching region, searches for red eye within the red eye searching region by using a second parameter different from the first parameter, to detect one or more red eye candidates.

9. The red eye detecting apparatus as set forth in claim 8, wherein
the first red eye searching section searches for red eye to detect one or more red eye candidates by successively moving a searching position by a first pixel distance within the red eye searching region, and the second red eye searching section searches for red eye to detect one or more red eye candidates by successively moving a searching position by a second pixel distance different from the first pixel distance within the red eye searching region.

10. The red eye detecting apparatus as set forth in claim 1, wherein
the red eye searching region determining section includes:
an eye detecting section that detects a positional relation between the eyes based on the designated red eye region obtained by the red eye region designating section; and
a face region identifying section that identifies a region of the face based on the positional relation between the eyes which is detected by the eye detecting section, and
the red eye searching region determining section determines the red eye searching region including therein the region of the face which is identified by the face region identifying section.

11. The red eye detecting apparatus as set forth in claim 1, wherein
the red eye searching region determining section includes:
an eye detecting section that detects sizes of the eyes based on the designated red eye region obtained by the red eye region designating section; and
a face region identifying section that identifies a region of the face based on the sizes of the eyes which are detected by the eye detecting section, and
the red eye searching region determining section determines the red eye searching region including therein the region of the face which is identified by the face region identifying section.

12. A red eye detecting method comprising:
using one or more processors to perform steps including:
causing a user to designate a red eye region in an image so as to obtain a designated red eye region;
determining a red eye searching region including therein the designated red eye region which is obtained in the user designating;
searching for red eye within the red eye searching region which is determined in the determining, to detect one or more red eye candidates;
detecting one of a position of a face and a position of an area of the face other than eyes within the red eye searching region which is determined in the determining; and
selecting, from the red eye candidates detected in the searching, a red eye candidate that is positioned at a predetermined position with respect to the position detected in the detecting, as a red eye candidate to be subjected to a red eye correcting process.

13. A computer readable medium storing thereon a red eye detecting program for a red eye detecting apparatus that detects red eye included in an image, the red eye detecting program causing the red eye detecting apparatus to function as:
a red eye region designating section that causes a user to designate a red eye region in the image so as to obtain a designated red eye region;
a red eye searching region determining section that determines a red eye searching region including therein the designated red eye region which is obtained by the red eye region designating section;

a red eye candidate detecting section that searches for red eye within the red eye searching region which is determined by the red eye searching region determining section, to detect one or more red eye candidates;

a face position detecting section that detects one of a position of a face and a position of an area of the face other than eyes within the red eye searching region which is determined by the red eye searching region determining section; and a red eye position judging section that selects, from the red eye candidates detected by the red eye candidate detecting section, a red eye candidate that is positioned at a predetermined position with respect to the position detected by the face position detecting section, as a red eye candidate to be subjected to a red eye correcting process.

* * * * *